F. BARZ.
ATTACHMENT FOR CULTIVATORS.
APPLICATION FILED JULY 11, 1911.
1,054,491.
Patented Feb. 25, 1913.
2 SHEETS—SHEET 1.
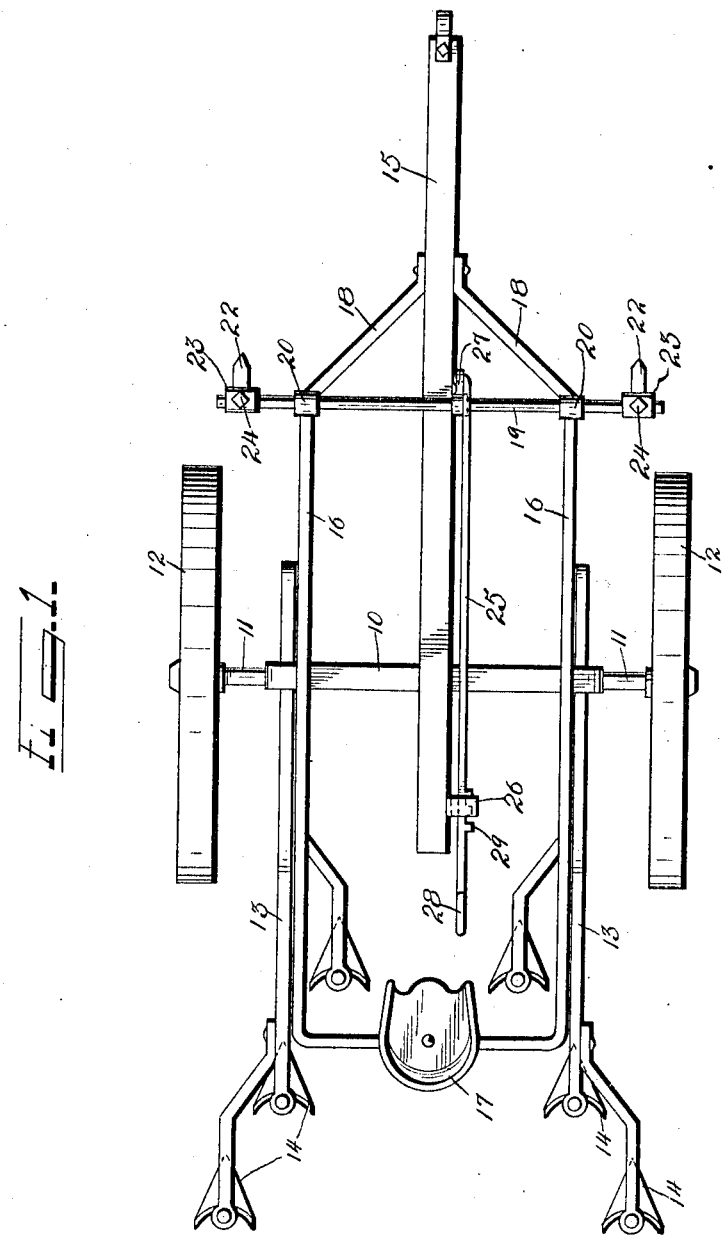

F. BARZ.
ATTACHMENT FOR CULTIVATORS.
APPLICATION FILED JULY 11, 1911.
1,054,491.
Patented Feb. 25, 1913.
2 SHEETS—SHEET 2.
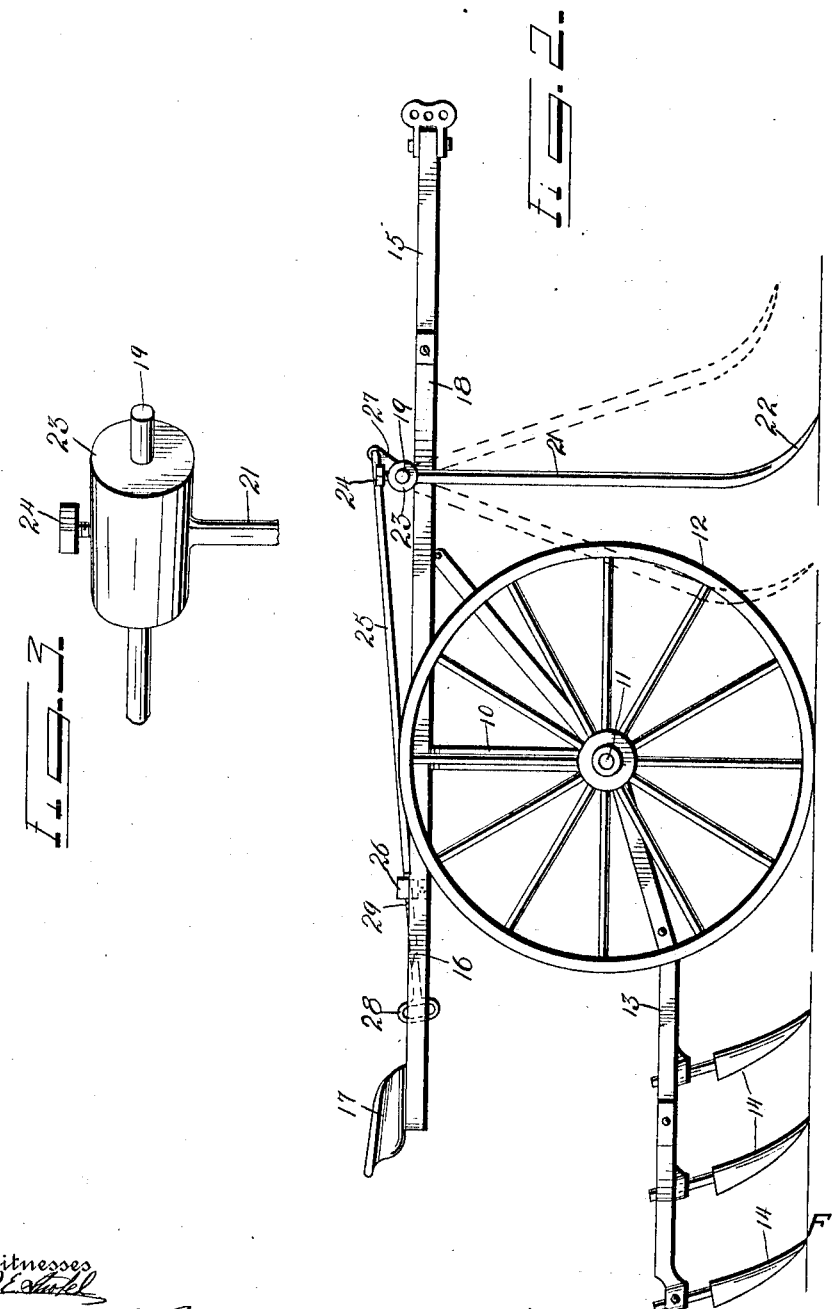

UNITED STATES PATENT OFFICE.

FREDERICK BARZ, OF VENTURA, IOWA.

ATTACHMENT FOR CULTIVATORS.

1,054,491.  Specification of Letters Patent.  Patented Feb. 25, 1913.

Application filed July 11, 1911. Serial No. 637,965.

*To all whom it may concern:*

Be it known that I, FREDERICK BARZ, a citizen of the United States, residing at Ventura, in the county of Cerro Gordo, State of Iowa, have invented certain new and useful Improvements in Attachments for Cultivators; and I do hereby declare the following to be a full, clear, and exact description of the invention, such as will enable others skilled in the art to which it appertains to make and use the same.

This invention relates to an attachment for cultivators and more especially to an attachment for a corn cultivator of the riding type having a double row of cultivators so as to operate upon both sides of young cornstalks.

The specific object of the invention is to provide an attachment which may be secured to an ordinary frame of a cultivator of the above type so as to pick up the corn in windy weather or after a storm, when the corn is leaning across the rows, so as to prevent the wheels of the cultivator from running over the corn-stalks or leaves and thus destroying the same.

Another object of the invention is to provide an attachment which may be applied to cultivators of a common type and in which a pair of depending arms are provided for engaging the stalks and directing the same to a vertical position and in which said arms are capable of movement toward and away from the wheels of the cultivator to facilitate the raising of the stalks.

With the above and other objects in view the invention consists of certain other combinations and arrangements of parts as will be hereinafter more fully described and claimed, it being a still further object to provide a device which will not be likely to get out of working order.

In the drawings:—Figure 1 is a top plan view of a cultivator with my improved attachment applied thereto. Fig. 2 is a side elevation thereof, with the arms shown in dotted lines in their foremost and rearmost positions. Fig. 3 is an enlarged detail showing the manner of connecting the arms to the rocking bar to permit adjustment thereof upon the bar.

Referring to the drawings in detail, there is shown my improved attachment applied to a straddle row wheeled cultivator which may be of any ordinary or improved construction and which comprises an arched axle 10 having oppositely extended spindle ends 11 upon which the supporting wheels 12 are journaled and adapted to straddle the rows of corn or plants during the cultivating operation. The cultivator is provided with the usual cultivator beams 13 having the usual plows 14, all of which may be of any ordinary or preferred construction and a draft tongue 15 extends rearwardly of the arch of the axle 10 and is rigidly secured by a frame structure 16.

The frame structure 16 has its side portions secured to the arch of the axle and extends rearwardly of the wheels to support the driver's seat 17, while the forward end of the frame has its side portions converged toward the tongue as shown at 18 and secured thereto. In the construction and application of my improved device for raising the corn stalks or leaves to a vertical position when cultivating the plants in windy weather or after a storm and when the corn is leaning across the rows, I provide a cross bar 19 which is secured transversely of the cultivator in front of the wheels 12 and mounted for pivotal or rocking movement in bearings 20 formed or provided upon the sides of the frame structure 16 adjacent to the converging portions 18.

As shown in the drawings, the bar 19 extends beyond the sides of the frame and carries a pair of depending arms 21 which are curved forwardly at their lower ends as shown at 22, said arms being sufficiently resilient to pass over rocks or any other such obstruction, although this is not likely to occur. These arms are positioned forwardly of the wheels and at their upper ends are provided with sleeve portions 23 whereby the said arms may be moved longitudinally upon the bar to accurately space the same apart in proper relation to engage the plants according to their angle of inclination and the said arms may be held in their adjusted position by suitable clamping members 24 engaged through the sleeve portions 23 for contact with the cross bar. The arms are thus held rigid for movement with the cross bar and in order that they may be swung forwardly or rearwardly in the position shown in Fig. 2 of the drawings, so as to properly engage the stalks during the travel of the cultivator along the rows of plants, an operating lever 25 extends longitudinally of the tongue rearwardly of the cross bar and is adapted for sliding movement in a sleeve 26 secured to the tongue. The forward ends of the lever 25 is pivotally connected to the upper end of a centrally located and comparative-short arm 27 which is rigidly secured to the cross bar and the rear end of the lever is provided with a grasping member 28 in position for convenient operation by the driver from the seat 17. It will thus be seen that by sliding the lever within the sleeve 26, rocking movement is imparted to the cross bar within its bearings so as to tilt the engaging arms to properly raise the stalk and leaves of the corn and in order to hold the lever in its adjusted position, a series of notches 29, preferably three in number are adapted for engagement with the sleeve 26 at one edge thereof when moved to different positions. By having the lever connected to the cross bar centrally of its length, the arms are capable of movement very easily and will be moved in unison to a common extent, thereby insuring proper engagement with the plants.

From the foregoing description in connection with the accompanying drawings, it will be seen that I have provided a simple and efficient device for the purpose intended which may be applied to cultivators in general and which by reason of its extreme simplicity of construction can be economically manufactured.

I claim:—

1. In an attachment for cultivators, the combination with the frame structure thereof; of a tongue connected to the frame and extending centrally between the same to a point adjacent the rear portion thereof, a seat mounted on the rear portion of the frame, said frame having opposite bearing portions at its forward end, a shaft rotatably supported therein and extending beyond the sides of the frame, depending arms having sleeve portions loosely mounted on the extremities of the shaft, set screws operating through said sleeve portions to engage the shaft and hold the arms in an adjusted position in their relation to the ground and with each other, an arm extending upwardly from the central portion of the shaft, a lever connected to the free end of the arm and extending rearwardly of the tongue and means carried by the tongue for engaging the lever and holding the same in an adjusted position.

2. In an attachment for cultivators, the combination with a frame structure, tongue and wheels thereof; of a cross bar journaled upon the frame forwardly of the wheels, arms slidable on and depending from the bar adjacent its ends and immediately inside of the wheels, a lever connected to the bar for rocking the same and extending along the tongue, said lever being provided with a plurality of notches and a sleeve member carried by the tongue through which said lever operates, said sleeve being adapted to be engaged by the notches for stationing the lever and holding the arms in an adjusted position.

In testimony whereof, I affix my signature, in presence of two witnesses.

FRED. BARZ.

Witnesses:
J. A. HANSEN,
LAWRENCE S. BLESS.